(12) United States Patent
Kito

(10) Patent No.: US 7,602,094 B2
(45) Date of Patent: Oct. 13, 2009

(54) ROTARY ELECTRIC MACHINE AND RELATED COMMUTATOR

(75) Inventor: Kazuyuki Kito, Nagoya (JP)

(73) Assignee: Denso Corporation, Kariya (JP)

( * ) Notice: Subject to any disclaimer, the term of this patent is extended or adjusted under 35 U.S.C. 154(b) by 228 days.

(21) Appl. No.: 11/902,434

(22) Filed: Sep. 21, 2007

(65) Prior Publication Data
US 2008/0093949 A1   Apr. 24, 2008

(30) Foreign Application Priority Data
Oct. 19, 2006   (JP) .............. 2006-285091

(51) Int. Cl.
  *H02K 13/00* (2006.01)
(52) U.S. Cl. .................... 310/236; 310/234
(58) Field of Classification Search .......... 310/233–236
  See application file for complete search history.

(56) References Cited

U.S. PATENT DOCUMENTS 3,080,615 A * 3/1963 Carlson et al. .......... 156/303.1
5,612,584 A * 3/1997 York et al. .............. 310/232
5,760,517 A * 6/1998 Stolpmann .............. 310/233
6,114,791 A * 9/2000 Ito et al. ................ 310/233
6,744,169 B2 * 6/2004 Yoshida et al. .......... 310/236
2007/0067981 A1 * 3/2007 Potocnik ................ 29/597

FOREIGN PATENT DOCUMENTS

JP   A-2003-348799   12/2003

* cited by examiner

*Primary Examiner*—Dang D Le
(74) *Attorney, Agent, or Firm*—Oliff & Berridge PLC

(57) ABSTRACT

A rotary electric machine and a commutator for the rotary electric machine are disclosed wherein the commutator includes an insulating member carrying thereon a plurality of commutator segments each having a brush contact surface. Each commutator segment has an embedded portion formed with a tab tail, molded to the insulating member, and has a riser portion radially extending outward from the brush contact surface to be electrically connected to armature coils. The insulating member has a large diameter portion and an increased wall thickness portion, axially extending from the large diameter portion in a direction away from the riser portion, with a sum of axial wall thicknesses of the increased wall thickness portion and the large diameter portion lying in a value two times an axial wall thickness of the riser portion. The increased wall thickness portion is formed in a tapered shape.

9 Claims, 3 Drawing Sheets

ROTARY ELECTRIC MACHINE AND RELATED COMMUTATOR

CROSS REFERENCE TO RELATED APPLICATIONS

This application is related to Japanese Patent Application No. 2006-285091, filed on Oct. 19, 2006, the content of which is hereby incorporated by reference.

BACKGROUND OF THE INVENTION

1. Technical Field of the Invention

The present invention relates to rotary electric machines and, more particularly, to a rotary electric machine, having a commutator, and a commutator for such a rotary electric machine.

2. Description of the Related Art

In recent years, for rotary electric machines (in particular, starters) installed on vehicles, there have been needs for the rotary electric machines to have structures each in a small size and lightweight with an aim of limiting an installation space and improving fuel consumption. As one example of expedients for addressing such needs, an attempt has heretofore been made to provide a rotary electric machine that includes armature coils each adopting a rectangular wire to have an increased occupation factor while providing increased output torque.

Meanwhile, when making wire connection between the armature coils and a commutator, it has been a general practice for the commutator to have a plurality of commutator segments each formed with a riser portion. The riser portion is formed with a slot to which end portions of the armature coils are inserted and connected to the riser portion by fusing. With the armature coils employing the rectangular wires, the rectangular wires are inserted to the slot of the riser portion such that longitudinal axes of the rectangular wires in cross section are placed in the slot along a radial direction. With such a structure, the riser portions of the commutator segments necessarily have larger size in outer diameter than those of the armature coils each employing a rounded wire. This results in an increase in a mass of the riser portions, making it difficult to make a design with centrifugal force resistance.

As one of expedients for the commutator to endure a centrifugal force, an attempt has been made to provide a commutator of the type disclosed in U.S. Pat. No. 6,744,169. The commutator of such a related art includes plural commutator segments. Each commutator segment has radially inward ends formed with axially extending projecting portions. The axially extending projecting portions are embedded in an insulating mold resin. Moreover, each commutator segment has an anchor portion, embedded in the mold resin, which has both axial ends formed with substantially C-shaped depressed portions on which circular metallic bands are disposed. This allows the commutator segments to be firmly retained in the mold resin to endure a high centrifugal force.

With the commutator of the related art mentioned above, the use of metallic bands results in an increase in the number of component parts. Also, this results in an increase in a production man-hour. These cause an issue to arise with the occurrence of an increase in cost.

To address such an issue, another attempt has heretofore been made to provide a commutator that includes plural commutator segments. Each commutator segment has a radially inward portion, embedded in a mold resin, which is formed with a tab tail to endure a high centrifugal force. The commutator segment has no need to use separate component elements such as metallic bands or the like, causing no increase in the number of component parts and production man-hour while enabling the production of the commutator at low cost. As set forth above, however, in a case where the armature coils adopt the rectangular wires, the riser portions of the commutator segments increase in outer diameter with an increase in mass. This causes an increase in centrifugal force acting on the mold resin via the riser portions. This results in the occurrence of concentrated stress acting on the mold resin in areas retaining radially inward areas of the riser portions. This causes a cracking to occur in the mold resin, resulting in an issue to arise with a difficulty of enduring a centrifugal force.

SUMMARY OF THE INVENTION

The present invention has been completed with a view to addressing the above issues and has an object to provide a rotary electric machine and a commutator for such an rotary electric machine that can increase centrifugal force resistance at low cost.

To achieve the above object, a first aspect of the present invention provides a rotary electric machine comprising a stator for generating a magnetic field therein, a rotor rotating inside the stator and including an armature core and armature coils held in the armature core, and a commutator connected to the rotor for supplying electric current to the armature coils, the commutator including a plurality of commutator segments, each having a brush contact surface held in sliding contact with brushes, and an insulating member unitarily molded with the plurality of commutator segments. Each of the commutator segments, having an embedded portion formed with a tab tail and molded to the insulating member, has one axial end formed with a riser portion, radially extending outward from the brush contact surface, to which end portions of the armature coils are electrically connected. The insulating member has one axial end formed with a large diameter portion, having a larger diameter than that of the brush contact surface, and an increased wall thickness portion, axially extending from the large diameter portion in a direction away from the riser portion, with a sum of axial wall thicknesses of the increased wall thickness portion and the large diameter portion lying in a value two times an axial wall thickness of the riser portion.

With the rotary electric machine of such a structure, the insulating member has the increased wall thickness portion formed with the large diameter portion in an area opposite to the rise portions. This allows the insulating member to have an increased strength portion, formed in front of the riser portions of the commutator segments, which includes the large diameter portion and the increased wall thickness portion. This provides an increased cross-sectional surface area (a sum of cross sectional surface areas of the large diameter portion and the increased wall thickness portion) in a forward portion of the insulating member ahead of the riser portions of the commutator segments. Thus, the insulating member can have increased mechanical strength to enhance an increased withstanding margin against the rupturing, thereby increasing centrifugal force resistance.

Further, the insulating member has a physical volume increased by a component equivalent to the increased wall thickness portion. This results in an increase in a thermally withstanding margin, thereby minimizing thermal degradation of the insulating member.

With the rotary electric machine of the present embodiment, each of the commutator segments may preferably have one axial end face formed with a recessed portion that is embedded in the insulating member.

With such a structure, the recessed portions, formed on the axial end faces of the commutator segments, are embedded in the insulating member. This allows the recessed portions of the commutator segments to be filled with the insulating member, providing so-called anchoring effects to have increased centrifugal force resistance.

With the rotary electric machine of the present embodiment, each of the armature coils may be preferably composed of a rectangular wire having a square shape in cross section.

With the armature coils adopting the rectangular wires, the riser portions of the commutator segments increase in outer diameter with a resultant increase in mass of the riser portions. This causes increased stress to act on the insulating member via the riser portions.

With the rotary electric machine of the present embodiment, the insulating member is provided with the increased wall thickness portion. This permits the insulating member to ensure an increased withstanding margin against the rupturing. Thus, even if the armature coils adopt the rectangular wires, the commutator can have an increased centrifugal force resistance.

With the rotary electric machine of the present embodiment, the increased wall thickness portion may preferably have a tapered shape that gradually decreases in outer diameter toward an axial end of the insulating member at a position in opposition to the large diameter portion.

If the increased wall thickness portion is formed in an unduly increased outer diameter, it is likely that an interference occurs between the armature coils and the increased wall thickness portion due to a specific wiring pattern in which the armature coils axially extend in areas near an outer diametric periphery of the increased wall thickness portion. With the commutator of the structure mentioned above, the increased wall thickness portion is tapered in shape so as to gradually decrease in outer diameter toward the axial end of the insulating member at the position in opposition to the large diameter portion. This particular arrangement addresses a fear of the interference between the armature coils, connected to the riser portions, and the increased wall thickness portion.

Further, with the increased wall thickness portion formed in the tapered shape, a clearance can be created between the outer circumferential periphery of the increased wall thickness portion and the armature coils extending in the areas radially outside the outer circumferential periphery of the increased wall thickness portion. This provides an increased freedom in design in forming the armature coils especially when forming coils end portions of the armature coils connected to the riser portions, resulting an ease of forming the coil end portions.

A second aspect of the present invention provides a commutator for a rotary electric machine having an armature provided with armature coils and fixedly supported on an armature shaft, the commutator comprising a cylindrically shaped insulating member fixedly supported on the armature shaft adjacent to one axial end face of the armature; and a plurality of commutator segments unitarily embedded on an outer circumferential periphery of the insulating member at circumferentially and equidistantly spaced positions and each having a brush contact surface available to be held in sliding contact with brushes. Each of the commutator segments, having an embedded portion formed with a tab tail molded to the insulating member, has one axial end formed with a riser portion, radially extending outward from the brush contact surface, to which end portions of the armature coils are electrically connected. The insulating member has one axial end formed with a large diameter portion, having a larger diameter than that of the brush contact surface, and a increased wall thickness portion, axially extending from the large diameter portion in a direction away from the riser portion, with a sum of axial wall thicknesses of the increased wall thickness portion and the large diameter portion lying in a value two times an axial wall thickness of the riser portion.

With the commutator of such a structure, the insulating member has a front portion formed with the increased wall thickness portion and the large diameter portion in an area opposite to the rise portions. Thus, the insulating member has an increased strength portion, formed in front of the riser portions of the commutator segments, which includes the large diameter portion and the increased wall thickness portion. This results in an increased cross-sectional surface area (a sum of cross sectional surface areas of the large diameter portion and the increased wall thickness portion) in a forward portion of the insulating member ahead of the riser portions of the commutator segments. Therefore, the insulating member can have increased mechanical strength to enhance an increased withstanding margin against the rupturing, thereby increasing centrifugal force resistance.

Further, the insulating member has a physical volume increased by a component equivalent to the increased wall thickness portion. Therefore, the insulating member can have an increased thermally withstanding margin, thereby minimizing thermal degradation of the insulating member.

DETAILED DESCRIPTION OF PREFERRED EMBODIMENTS

Now, a rotary electric machine and a commutator of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, it is to be understood that such terms as "front", "rear", "radial", "axial", "coaxial", "axially", "parallel", "rotational", "inner", "inward", "forward", "rearward", "outside", "toward", "opposite", "away", "rightward", "leftward", "clockwise", "counterclockwise" and the like are words of convenience and are not to be construed as limiting terms.

Embodiment

A rotary electric machine of one embodiment according to the present invention will be described below in detail with reference to a starter shown in FIGS. 1 to 3 of the accompanying drawings.

FIG. 1 is a half cross-sectional view showing a commutator forming part of the rotary electric machine. FIG. 2 is a half cross-sectional view showing the rotary electric machine incorporating the commutator.

Figure 2:
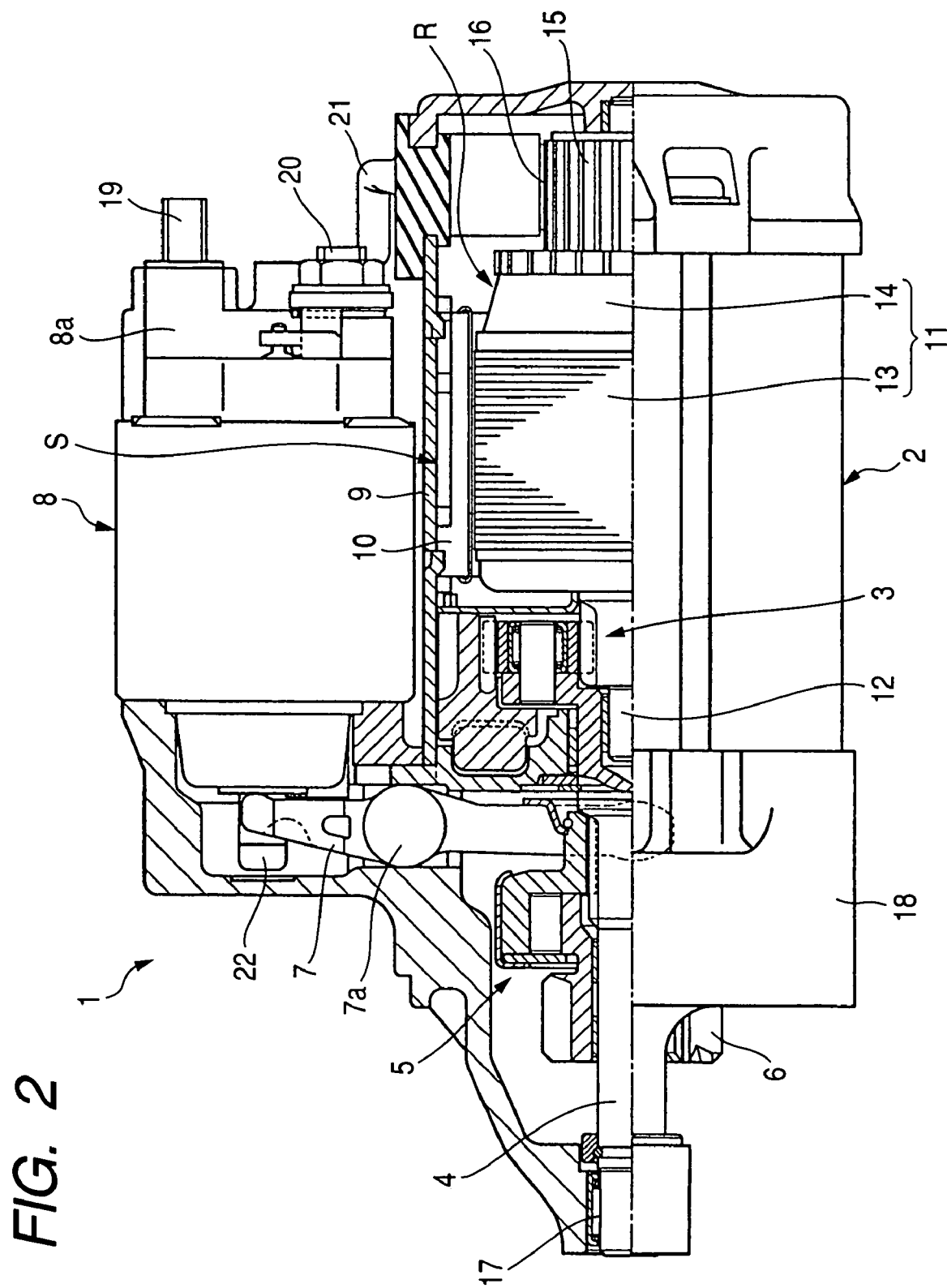
FIG. 2 is a cross sectional view in half of a starter incorporating a rotary electric machine of one embodiment according to the present invention.
Figure 3:
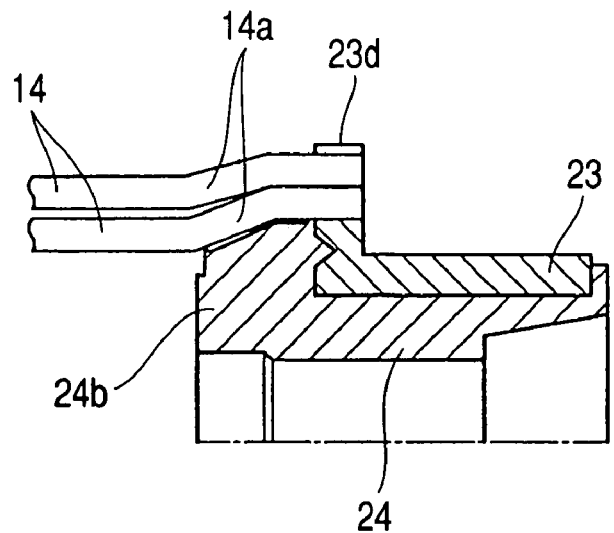
FIG. 3 is a cross sectional view in half of the commutator shown in FIGS. 1A and 1B.

With the present embodiment, as shown in FIG. 2, the starter 1 includes a motor 2 carried on a housing 18 and generating an output torque, a reduction gear unit 3 placed in front of the motor 2 for reducing a rotational speed thereof, an output shaft 4 rotatably supported with the housing 18 in front of the reduction gear unit 3 to receive a drive torque of the motor 2 via the gear reduction unit 3, a pinion gear 6 slidably carried on the output shaft 4 and integrally associated with a clutch 5, and an electromagnetic switch 8.

The electromagnetic switch 8 is fixedly supported with the housing 18 in parallel to the motor 2 and serves to push the clutch 5 and the pinion gear 6 in a direction opposite to the motor 2, that is, in a leftward direction as viewed in FIG. 2. In addition, the electromagnetic switch 8 serves to open or close a main contact (described later) provided in a power distribution circuit (hereinafter referred to as a motor circuit) of the motor 2.

The motor 2 is a D.C. current motor including a stator S for generating a magnetic field therein and a rotor R rotating inside the stator S. The stator S includes a cylindrical yoke 9, fixedly supported to and extending rearward from a housing 18, which generates a magnetic flux circuit, and a plurality of permanent magnets 10 carried on an inner circumferential periphery of the yoke 9 at circumferentially and equidistantly spaced positions. The rotor R includes an armature 11 rotatably disposed radially inward the plurality of permanent magnets 10 with a given gap.

The armature 11 includes an armature shaft 12 from which the output torque is delivered, an armature core 13 fixedly carried on an outer periphery of the armature shaft 12, an armature coils 14 wound on the armature core 13, and a commutator 15 (described below in detail) fixedly connected to the armature core 13 and mounted on the armature shaft 12 at a rear end thereof for supplying electric current to the armature coils. Brushes 16 are held in sliding contact with an outer periphery of the commutator 15 to convert A.C. electric power to a D.C. electric power. In addition, the armature coils 14 includes rectangular wires, each formed in a rectangular shape in cross section and covered with an insulating film, which are stacked in slots, formed on an outer periphery of the armature core 13, in two layers in a radial direction.

The reduction gear unit 3 includes a planetary gear set, operative to reduce the rotational speed of the armature 11 in a coaxial relation with the armature shaft 12, which is placed in a position opposite to the commutator 15.

The output shaft 4, placed in coaxial relation with the armature shaft 12, has one end rotatably supported with the housing 18 by means of a bearing 17 and the other end connected to the reduction gear unit 3.

The clutch 5 is assembled to the outer periphery of the output shaft 4 in a helical spline engagement to transfer the rotation of the output shaft 4 to the pinion gear 6 during a startup of an internal combustion engine (not shown). Moreover, the clutch 5 is structured to play a role as a one-way clutch such that when the engine has started up to rotate the pinion gear 6, that is, when the rotational speed of the pinion gear 6 exceeds the rotational speed of the output shaft 4, a power transfer path between the output shaft 4 and the pinion gear 6 is interrupted to prevent a transfer of the rotation of the pinion gear 6 to the output shaft 4.

The pinion gear 6 is placed on the clutch 5 in a position opposite to the motor 2 and axially movable on the output shaft 4 in a unitized relation with the clutch 5. This allows the pinion gear 6 to be brought into meshing engagement with a ring gear (not shown) of the engine to transfer the output torque of the armature shaft 12 to the ring gear via the clutch 5.

The electromagnetic switch 8 includes an electromagnetic coil (not shown), supplied with electric power from an on-vehicle battery with a starter switch (not shown) being closed, and a plunger (not shown) axially movable inside the electromagnetic coil. When the electromagnetic coil is supplied with electric power thereby forming an electromagnet, the electromagnet attracts the plunger against a reaction force of a return spring (not shown), thereby closing the main contact. Further, when the supply of electric power to the electromagnet is interrupted to distinguish the attraction force of the electromagnet, the reaction force of the return spring pushes the plunger back to its original position to open the main contact.

The main contact includes one set of stationary contacts (not shown) connected to the motor circuit through two external terminals 19, 20, and a movable contact (not shown) integrally movable with the plunger for connecting or disconnecting the one set of stationary contacts. With the one set of stationary contacts being conducted through the movable contact, the main contact is brought into a closed state. In contrast, with a conducting state of one set of stationary contacts being interrupted, the main contact is brought into an opened state.

The external terminal 19 is a B-terminal connected to the on-vehicle battery via a battery cable and the external terminal 20 is an M-terminal 20 connected to the brushes 16 on a positive electrode side via motor lead wires 21, with the external terminals 19, 20 being fixedly supported with a plastic resin cover 8a of the electromagnetic switch 8.

The shift lever 7 includes a lever fulcrum 7a swingably supported on the housing 18. The shift lever 7 has one lever end extending from the lever fulcrum 7a in one direction for connection to a shifting rod 22 mounted on the plunger of the electromagnetic switch 8 and the other lever end extending from the lever fulcrum 7a in the other direction for engagement with the clutch 5. As the electromagnet attracts the plunger, the shift lever 7 swings clockwise as viewed in FIG. 2. This causes the plunger to pull the shifting rod 22 and the one lever end rightward in axial movement. When this takes place, the other lever end engaging with the clutch 5 moves leftward, pushing the clutch 5 in a direction opposite to (away from) the motor 2.

Now, an overall structure of the commutator 15 of the present embodiment will be described below in detail.

Figure 1A:
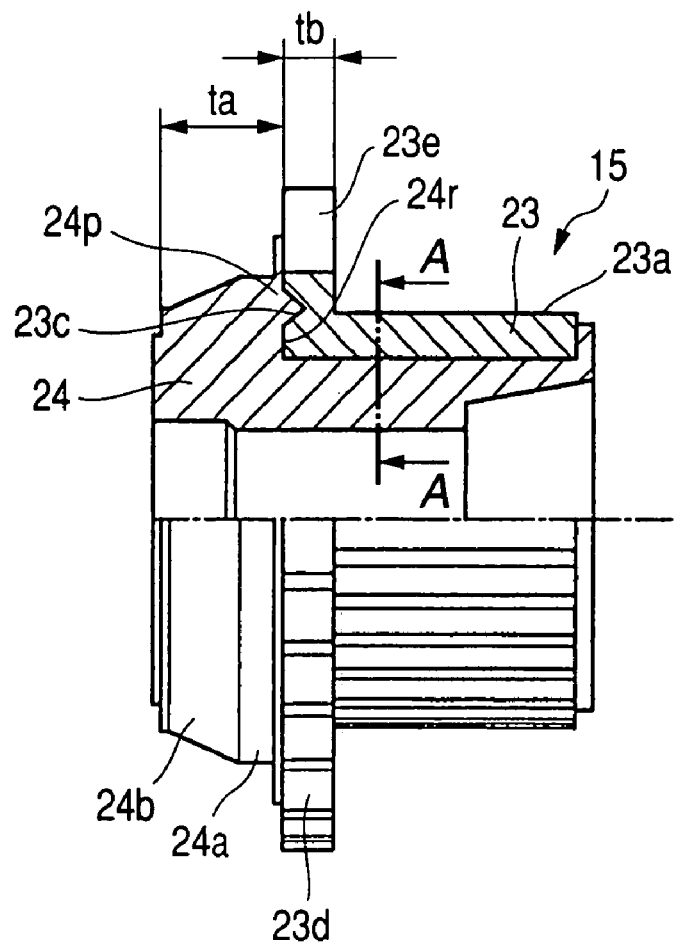
FIG. 1A is a cross sectional view in half of a commutator of one embodiment according to the present invention.
Figure 1B:
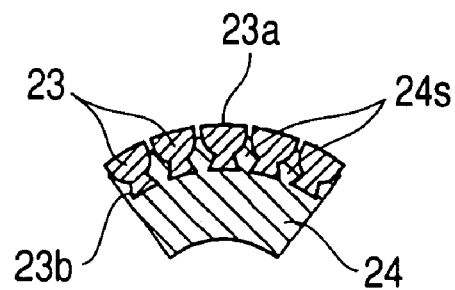
FIG. 1B is a cross sectional view taken on line A-A of FIG. 1A.

As shown in FIGS. 1A and 1B, the commutator 15 includes a plurality of commutator segments 23 having contact surfaces (hereinafter referred to as brush contact surfaces 23a) with which the brushes 16 are held in sliding contact, and an insulating member (hereinafter referred to as a mold resin body 24) integrally molding the plurality of commutator segments 23. The mold resin body 24 is press fitted to and fixed to an outer periphery of the armature shaft 12 at a rear end thereof. As shown in FIG. 1B, the commutator segments 23 are placed on the mold resin body 24 at circumferentially and equidistantly spaced positions with an equal pitch with adjacent segments 23 being insulated from each other by an insulation spacer 24s radially extending from an outer periphery of the mold resin body 24. Each commutator segment 23 has a radially inward end (hereinafter referred to as an embedded portion) formed with a tab tail 23b that is embedded in the mold resin body 24. Further, the embedded portion of the commutator segment 23 has one axial end face formed with a substantially V-shaped recessed portion 23c opened in an axial and frontal direction. The V-shaped recessed portion 23c is held in mating engagement with an annular ridge 24p formed on a radial surface 24r of the mold resin body 24.

As shown in FIG. 1A, further, the commutator segment 23 has a front axial end formed with a riser portion 23d that protrudes radially outward from the brush contact surface 23a. The riser portion 23d has an outer circumferential periphery formed with a radially extending slot 23e that is opened radially outward. Coil end portions of the armature coils 14 are inserted to the slot 23e and electrically and mechanically connected to the riser portion 23d by, for instance, fusing or the like as shown in FIG. 3.

As shown in FIG. 1A, the mold resin body 24 has a front axial end portion formed with a large diameter portion 24a, having a larger diameter than that of the brush contact surface 23a, which is molded with radially inside portions of the riser portions 23d. The mold resin body 24 has an increased wall thickness portion 24b axially protruding forward from the riser portion 23d in a direction opposite to the riser portion 23d. The increased wall thickness portion 24b is tapered in shape such that an outer diameter decreases toward a front end of the mold resin body 24, that is, in a direction opposite to the large diameter portion 24a.

Furthermore, an axial wall thickness ta equivalent to a sum of the large diameter portion 24a and the increased wall thickness portion 24b is set to have a value two times an axial wall thickness tb of the riser portion 23d.

Next, the operation of the starter 1 will be described below.

With the starter switch being closed, the electromagnetic coil of the electromagnetic switch 8 is supplied with electric power thereby forming an electromagnet. In this moment, the electromagnet attracts the plunger against the force of the return spring, causing the plunger to move rightward as viewed in FIG. 2. The rightward movement of the plunger is transferred to the clutch 5 via the shift lever 7. When this takes place, the clutch 5 and the pinion gear 6 are caused to unitarily slide on the output shaft 4 in a forward direction, that is, in a direction opposite to the motor 2 until an end face of the pinion gear 6 is brought into abutting contact with an end face of the ring gear of the engine upon which the pinion gear 6 is halted.

Meanwhile, the main contact of the motor circuit is closed due to the rightward movement of the plunger. This allows electric power to be supplied to the motor 2 from the on-vehicle battery, causing the armature 11 to generate a rotational power. The rotation of the armature 11 is reduced in speed by the reduction gear unit 3 and transferred to the output shaft 4. In addition, the rotation of the armature 11 is transferred from the output shaft 4 to the pinion gear 6 via the clutch 5. As a result, the pinion gear 6 is forcibly rotated to a rotary position available to cause the pinion gear 6 to be brought into meshing engagement with the ring gear of the engine. Thus, the pinion gear 6, meshing with the ring gear, transfers the drive torque of the motor 2 to the ring gear, thereby cranking up the engine.

With a complete combustion occurring in the engine with the cranking-up operation of the ring gear, the starter switch is opened thereby interrupting the supply of electric power to the electromagnetic coil to distinguish the attracting force acting on the plunger. This allows the plunger to be restored to its original forward position due to the reaction force of the return spring. Thus, the main contact is opened thereby interrupting the supply of electric power from the on-vehicle battery to the motor 2. Therefore, the rotation of the armature 11 gradually decelerates and halts in a final stage.

As the plunger is restored, further, the shift lever 7 is caused to swing counterclockwise about the lever fulcrum 7a, that is, in a direction opposite to the direction in which the shift lever 7 swings clockwise at the startup of the engine, causing the movement of the plunger to be transferred to the clutch 5. As a result, the pinion gear 6 is caused to disengage from the ring gear of the engine. When this takes place, the pinion gear 6 and the clutch 5 are unitarily retracted to a given rearward position (at a location shown in FIG. 2) at which the pinion gear 6 and the clutch 5 are halted.

Advantageous Effects of Embodiment

With the commutator 15 of the present embodiment, the commutator segment 23, molded on the mold resin body 24, has the embedded portion formed with the tab tail 23b. In addition, the commutator segment 23 has the front end, formed with the riser portion 23d, which has the front end face formed with the recessed portion 23c. The recessed portion 23c is held in mating engagement with the annular ridge 24p of the mold resin body 24. This provides an anchoring effect that is exhibited against centrifugal force acting on the commutator segment 23 when the armature 11 rotates at a high speed. Thus, none of the commutator segments 23 are caused to float from the mold resin body 24, enhancing increased centrifugal-force resistance.

Figure 4:
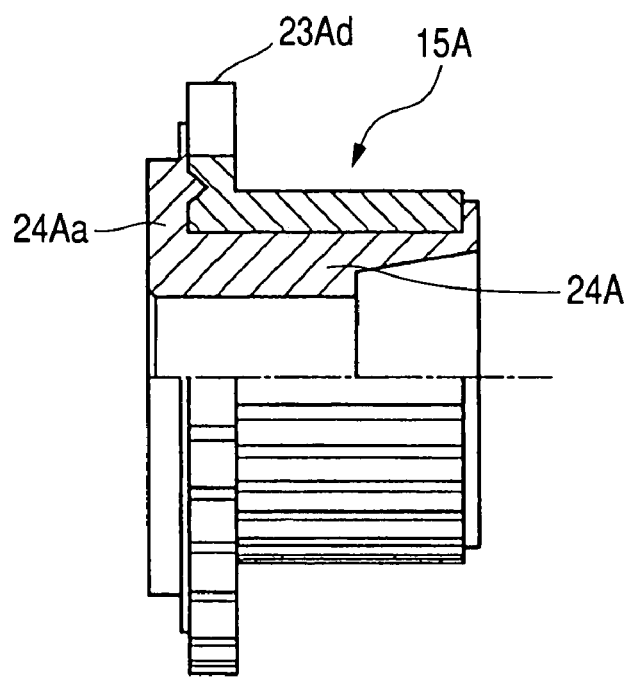
FIG. 4 is a cross sectional view in half of a commutator of the related art.

Further, the mold resin body 24 has the increased wall thickness portion 24b formed in a front position opposite to the riser portion 23d so as to axially extend forward from the large diameter portion 24a. This provides a further increase in a cross-sectional surface area (a sum of cross-sectional surface areas of the large diameter portion 24a and the increased wall thickness portion 24b) of the mold resin body 24 than that of the riser portion 23d. In this respect, the commutator 15A of the related art has no increased wall thickness portion as shown in FIG. 4. With a structure of the commutator 15A of the related art, a mold resin body 24A has a front end formed with only a large diameter portion 24Aa in an area in front of a riser portion 23Ad. Therefore, the mold resin body 24A has a front portion whose cross-sectional surface area is smaller than that of the commutator 15 of the present embodiment.

The increase in the cross-sectional surface area of the mold resin body 24 enables the mold resin body 24 to have an increased mechanical strength for enhancing an increased margin against a rupturing incident, causing the commutator 15 to have increased centrifugal-force resistance.

Further, the mold resin body 24 has a volume that is increased by the increased wall thickness portion 24b being provided. Thus, the mold resin body 24 has increased thermally stabilizing quality. This results in the suppression of thermal degradation of the mold resin body 24 to resist against various troublesome caused by heat developed when connecting the ends of the armature coils 14 to the riser portion 23d by thermal fusion, the self-heating of the motor 2 occurring when the motor 2 is continuously supplied with electric power and a heat developed upon friction between the brushes 16 and the commutator 15.

Furthermore, the increased wall thickness portion 24b, provided on the mold resin body 24, is formed in a tapered shape that gradually decreases in outer diameter toward the front end of the mold resin body 24 in a position opposite to the large diameter portion 24a. This avoids an interference between the armature coils 14, connected to the riser portion 23d, and the increased wall thickness portion 24b.

Moreover, with the increased wall thickness portion 24b having an outer periphery formed in the tapered shape, a given clearance can be created between the outer circumferential periphery of the increased wall thickness portion 24b and coil end portions 14 of the armature coils 14 extending by a radially outside area of the increased wall thickness portion 24b. This provides an increased freedom in forming the coil end portions 14a of the armature coils 14 to be connected to the riser portion 23d, providing a contribution to an ease of forming the coil end portions 14a.

While the present invention has been described above with reference to the first embodiment employing the armature coils 14 composed of the rectangular flat wire, the present invention is not limited to such a particular structure. It will be appreciated that the commutator 15 of the present invention can be applied to a structure employing a rounded wire formed in a circular shape in cross section.

What is claimed is:

1. A rotary electric machine comprising:
   a stator for generating a magnetic field therein;
   a rotor rotating inside the stator and including an armature core and armature coils held in the armature core; and
   a commutator connected to the rotor for supplying electric current to the armature coils, the commutator including a plurality of commutator segments, each having a brush contact surface held in sliding contact with brushes, and an insulating member unitarily molded with the plurality of commutator segments;
   wherein each of the commutator segments, having an embedded portion formed with a tab tail and molded to the insulating member, has one axial end formed with a riser portion, radially extending outward from the brush contact surface, to which end portions of the armature coils are electrically connected; and
   wherein the insulating member has one axial end formed with a large diameter portion, having a larger diameter than that of the brush contact surface, and an increased wall thickness portion, axially extending from the large diameter portion in a direction away from the riser portion, with a sum of axial wall thicknesses of the increased wall thickness portion and the large diameter portion lying in a value two times an axial wall thickness of the riser portion.

2. The rotary electric machine according to claim 1, wherein:
   each of the commutator segments has one axial end face formed with a recessed portion that is embedded in the insulating member.

3. The rotary electric machine according to claim 1, wherein:
   each of the armature coils is composed of a rectangular wire having a square shape in cross section.

4. The rotary electric machine according to claim 1, wherein:
   the increased wall thickness portion has a tapered shape that gradually decreases in outer diameter toward an axial end of the insulating member at a position in opposition to the large diameter portion.

5. A commutator for a rotary electric machine having an armature provided with armature coils and fixedly supported on an armature shaft, the commutator comprising:
   a cylindrically shaped insulating member fixedly supported on the armature shaft adjacent to one axial end face of the armature; and
   a plurality of commutator segments unitarily embedded on an outer circumferential periphery of the insulating member at circumferentially and equidistantly spaced positions and each having a brush contact surface available to be held in sliding contact with brushes;
   wherein each of the commutator segments, having an embedded portion formed with a tab tail molded to the insulating member, has one axial end formed with a riser portion, radially extending outward from the brush contact surface, to which end portions of the armature coils are electrically connected; and
   wherein the insulating member has one axial end formed with a large diameter portion, having a larger diameter than that of the brush contact surface, and a increased wall thickness portion, axially extending from the large diameter portion in a direction away from the riser portion, with a sum of axial wall thicknesses of the increased wall thickness portion and the large diameter portion lying in a value two times an axial wall thickness of the riser portion.

6. The commutator for a rotary electric machine according to claim 5, wherein:
   each of the commutator segments has one axial end face formed with a recessed portion that is embedded in the insulating member.

7. The commutator for a rotary electric machine according to claim 5, wherein:
   each of the armature coils is composed of a rectangular wire having a square shape in cross section.

8. The commutator for a rotary electric machine according to claim 5, wherein:
   the increased wall thickness portion has a tapered shape that gradually decreases in outer diameter toward an axial end of the insulating member in opposition to the large diameter portion.

9. A starter for cranking up an internal combustion engine, the starter comprising a rotary electric machine as defined in claim 1.

* * * * *